(12) United States Patent
Edelman

(10) Patent No.: US 8,824,101 B2
(45) Date of Patent: Sep. 2, 2014

(54) WRITE POLE TIP WITH TRAILING EDGE RECESS

(71) Applicant: Seagate Technology LLC, Cupertino, CA (US)

(72) Inventor: Harry Sam Edelman, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/647,217

(22) Filed: Oct. 8, 2012

(65) Prior Publication Data
US 2014/0098442 A1 Apr. 10, 2014

(51) Int. Cl.
*G11B 5/127* (2006.01)
*G11B 5/187* (2006.01)

(52) U.S. Cl.
USPC ............... 360/125.11; 360/125.13; 360/122

(58) Field of Classification Search
CPC .... G11B 5/1278; G11B 5/3116; G11B 5/746; G11B 5/1871
USPC ............ 360/125.09, 125.13, 125.46, 125.51, 360/125.59, 125.64, 122, 125.11
See application file for complete search history.

(56) References Cited

U.S. PATENT DOCUMENTS

| | | | | |
|---|---|---|---|---|
| 5,495,379 | A * | 2/1996 | McNeil et al. | 360/125.13 |
| 6,504,675 | B1 * | 1/2003 | Shukh et al. | 360/125.12 |
| 6,741,421 | B2 * | 5/2004 | Mochizuki et al. | 360/125.13 |
| 6,950,277 | B1 * | 9/2005 | Nguy et al. | 360/125.14 |
| 7,436,628 | B2 * | 10/2008 | Kameda et al. | 360/125.1 |
| 7,475,470 | B2 * | 1/2009 | Mochizuki et al. | 29/603.15 |
| 7,576,951 | B2 * | 8/2009 | Allen et al. | 360/125.13 |
| 7,864,470 | B2 | 1/2011 | Gao et al. | |
| 7,869,160 | B1 * | 1/2011 | Pan et al. | 360/119.02 |
| 8,542,463 | B2 * | 9/2013 | Guan | 360/125.3 |
| 2004/0156142 | A1 * | 8/2004 | Mochizuki et al. | 360/125 |
| 2005/0219764 | A1 * | 10/2005 | Kameda et al. | 360/313 |
| 2008/0080082 | A1 | 4/2008 | Erden et al. | |
| 2011/0090583 | A1 | 4/2011 | Mutoh | |
| 2011/0222186 | A1 | 9/2011 | Itakura et al. | |
| 2011/0292545 | A1 | 12/2011 | Katada et al. | |
| 2012/0060073 | A1 | 3/2012 | Itakura et al. | |
| 2012/0099216 | A1 | 4/2012 | Grobis et al. | |

FOREIGN PATENT DOCUMENTS

JP 59079416 A * 5/1984
JP 2002133608 A * 5/2002

* cited by examiner

*Primary Examiner* — Will J Klimowicz
(74) *Attorney, Agent, or Firm* — Hall Estill Attorneys at Law

(57) ABSTRACT

A data writer may be constructed, in accordance with some embodiments, with a write pole tip that is configured with leading and trailing edges on opposite sides of a tip body. The trailing edge may be shaped by a recess that extends into the tip body towards the leading edge.

20 Claims, 4 Drawing Sheets

OUTER DIAMETER

194

NO SKEW 190   192

INNER DIAMETER

196

WRITE POLE TIP WITH TRAILING EDGE RECESS

SUMMARY

Various embodiments of the present disclosure are generally directed to a data writer that is capable of data recording.

In accordance with some embodiments, a write pole tip may be configured with leading and trailing edges on opposite sides of a tip body. The trailing edge can be shaped by a recess that extends into the tip body towards the leading edge.

DETAILED DESCRIPTION

The data storage industry continues to strive for devices with higher data capacity and faster data access. As data bits and data tracks become smaller, bit patterned media has emerged as providing increased areal bit density while maintaining data integrity. However, rotating bit patterned media can encounter difficulty in accommodating rotated transitions as patterned bit arrays do not self-assemble into skewed configurations. Such uniform patterned bit arrays can limit data bit writing times and reduce performance for data storage devices when data bits are being accessed from extreme skew angles. Thus, the data storage industry is motivated to provide a data storage device capable of maximizing data storage capacity and data transfer rates with bit patterned media, especially in high skew angle operation.

Accordingly, a write pole tip may be configured with leading and trailing edges on opposite sides of a tip body where the trailing edge is shaped by a recess that extends into the tip body towards the leading edge. The shaped recess may allow the write pole tip to be better aligned with data bits at extreme regions of a data medium where the pole tip is skewed. The ability to tune the shape of the recess can provide pole tip configurations that increase the efficiency and reliability of programming data by accommodating for pole tip skew angle.

Figure 1:
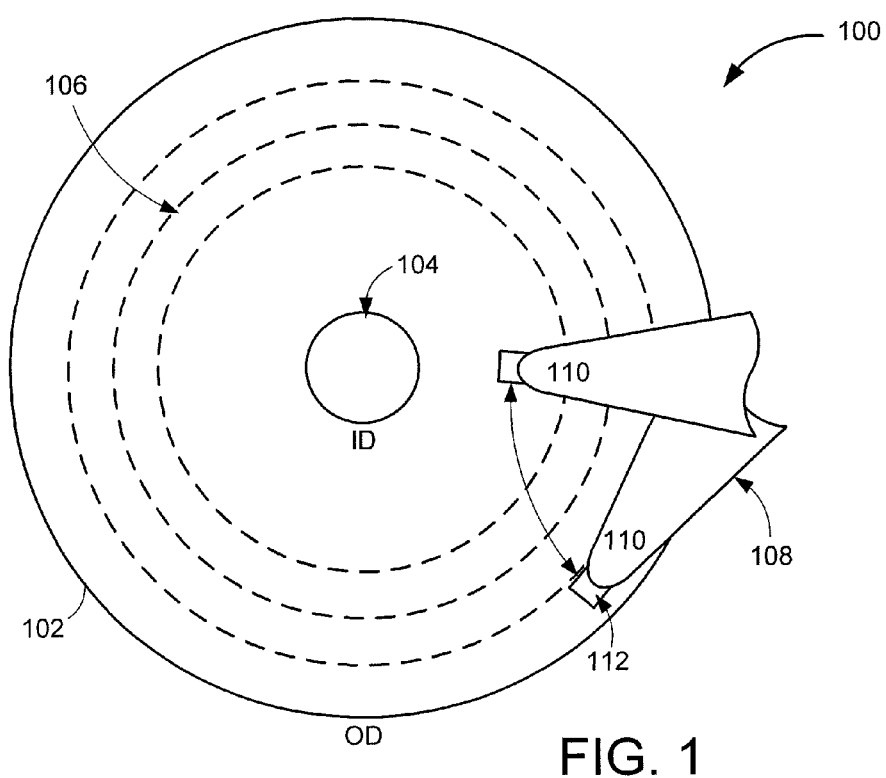
FIG. 1 is a block representation of an example portion of a data storage device.

FIG. 1 provides a top block representation of an example portion of a data storage device 100. It will be understood, however, that the various embodiments of this disclosure are not so limited by the environment shown in FIG. 1 and can be implemented to perform data access operations in a variety of data storage devices.

The device 100 may be configured with one or more rotating data media 102 centrally attached and controlled by a spindle motor 104. User accessible data bits (not shown), and other non-user accessible data such as grey code, can be aligned along concentric data tracks 106 that are accessed individually or concurrently by an actuating assembly 108. The actuating assembly 108 is displayed in accordance with various embodiments to include a load beam 110 that rotates to position a slider 112 proximal to one or more data tracks 106.

In operation, the rotation of the media 102 can generate an air bearing on which the slider 112 flies and positions a head gimbal assembly (HGA) to allow a transducing portion of the HGA to access one or more data bits. While not limiting, the slider 112 and HGA can include one or more transducing elements, such as a magnetic writer and/or magnetically responsive reader, which operate to program and read data from the storage media 102, respectively. In this way, controlled motion of the actuating assembly 108 induces the transducers to align with the data tracks 106 to write, read, and rewrite data.

Movement of the actuating assembly 108 to position the slider 112 proximal to selected data bits can tilt the orientation of the HGA with a "skew angle" that may affect the alignment of the transducing elements in relation to the data tracks 106. As the actuating assembly 108 moves the slider 112 towards the inner (ID) or outer (OD) diameter of the media 102, the skew angle can introduce angular offset between the magnetic field profile used to access data bits and the data bits themselves, which reduces the timing margin available for reading or writing data to/from the data bits.

The introduction of angular offset to a data storage device 100 can be particularly difficult to correct when the media 102 is configured as a bit patterned media where data bits are constructed as granular islands locked into predetermined positions on the media 102. The increase in data bit density and reduction in data track 106 width can further exacerbate the effects of skew angle on data bit access as the physical size of data writing elements are difficult to reduce and the timing margins face faster transfer rates per inch of media 102 space. Thus, shingled data recording can be employed to allow physically larger transducing elements to program multiple data bits from adjacent data tracks 106 concurrently.

Figure 2:
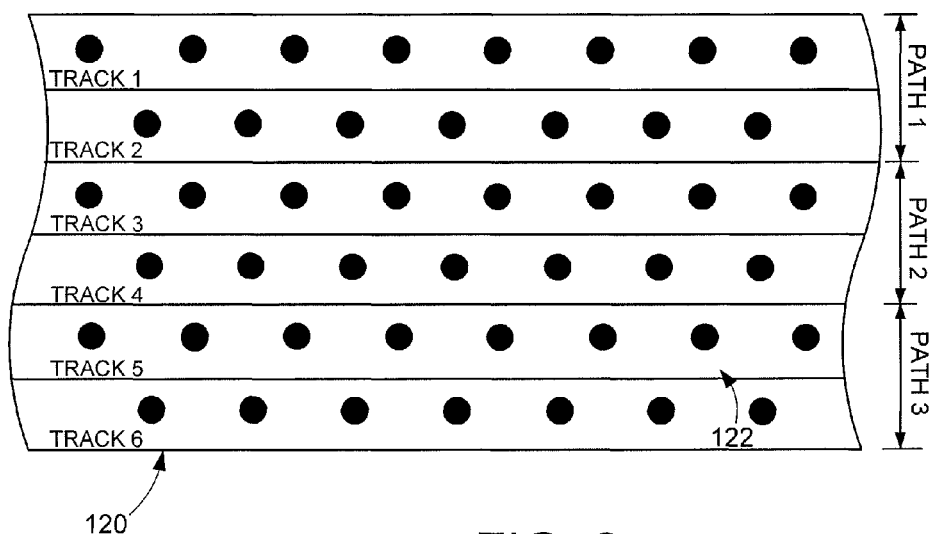
FIG. 2 provides a top view block representation of a portion of the data storage device displayed in FIG. 1.

FIG. 2 displays a portion of an example data storage media 120 capable of being used in the data storage device 100 of FIG. 1. The data storage media 120 is configured as a bit patterned media where columnar bits 122 are constructed into a recording layer of the media 120, as opposed to non-bit patterned media where data bits are programmed anywhere on a recording layer.

With shingled recording, a plurality of adjacent data bits 122 are grouped into data tracks (Track 1-6) that can be individually or concurrently read, but sequentially programmed with a data write pole that physically spans multiple tracks. That is, a write pole that is physically larger than a single data track can be used to program a multiple data tracks by sequentially programming multiple adjacent tracks in succession. As such, a write pole would program follow paths 1-3 in sequence to produce six distinctly programmed data tracks. It should be noted that while the data tracks of FIG. 2 are shown to be linear, such configuration is not required or limited as various data track shapes, such as curvilinear, can be used.

While the use of shingled data recording can increase the density of data bits by decreasing data track width for a given write pole size, data bit densities are continually increasing towards smaller data tracks and write poles, which can accentuate the effect of skew angle on shingled data recording. FIG.

3 generally shows a block representation of how skew angle can correspond to misalignment of a data write pole with bit patterned data bits 132.

Data write pole tip 134 illustrates proper alignment of the trapezoidal shaped tip with data bits 132 from adjacent data tracks 136. Proper alignment of the pole tip 134 is defined as a trailing edge 140 that is substantially orthogonal to the data tracks, which allows for efficient and reliable switching of pole tip 134 magnetization in the area 135 between data bits 132.

In contrast to the aligned write pole tip 134, pole tips 142 and 144 have roughly a seven degree skew angle, either positive or negative, that induces a tilted pole tip trailing edge with respect to a plane perpendicular to the direction of movement for the pole tips. The tilted trailing edge of pole tips 142 and 144 show how a slight skew angle can reduce the amount of time in which the pole tips can switch magnetizations due to the trailing edge 140 being in contact with multiple data bits 132 for a longer amount of time than when no skew angle is present. That is, the tilt of write pole tips 142 and 144 respectively changes the time the write pole trailing edge is not engaging a data bit, which stresses magnetization switching time in the pole tip.

At the inner and outer extremes of a data media, skew angle of can be approximately fourteen degrees or more. Write pole tips 146 and 148 respectively show how such positive and negative skew angle can further change the extremity of trailing edge contact with data bits 132, which further reduces the timing available to program a magnetic domain. Thus, it can be appreciated that an increased skew angle corresponds to a tilted trailing edge that reduces the amount of time the trialing edge 140 can change magnetization without inadvertently programming an already accessed data bit 132.

Figure 4:
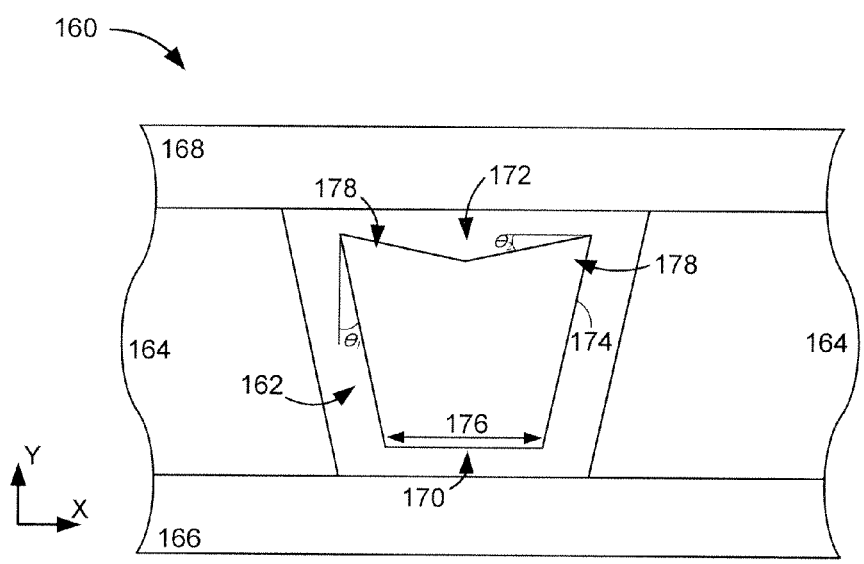
FIG. 4 displays a block representation of a portion of an example read sensor constructed in accordance with various embodiments.

Accordingly, the write pole 160 shown in FIG. 4 can be constructed with a trailing edge tuned to mitigate the effects of skew angle. The example write pole 160 is merely illustrative of one possible configuration that mitigates skew angle difficulties and is by no means limiting or required. The write pole 160 is displayed from an air bearing and shows a write pole tip 162 disposed between a pair of side shields 164, a leading shield 166, and a trailing shield 168.

Figure 3:
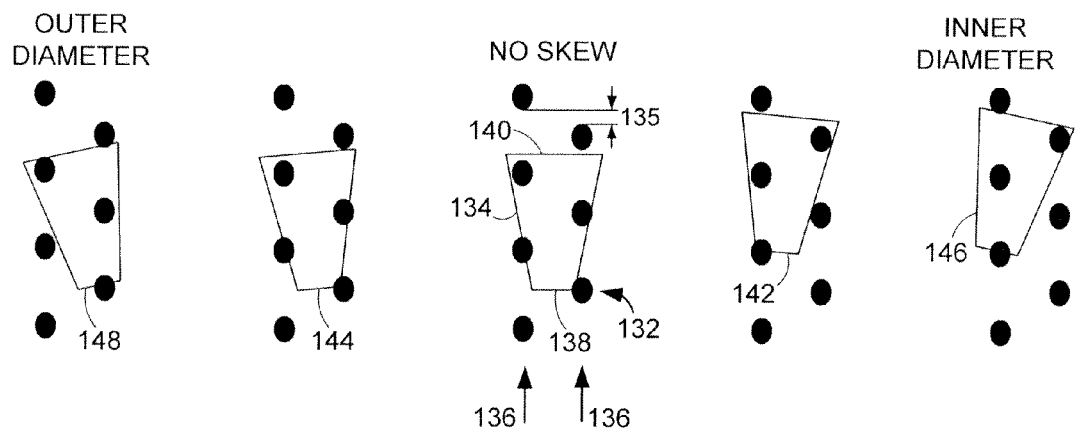
FIG. 3 shows an example block representation of a portion of an example data sensor capable of being used in the data storage device of FIG. 1.

The write pole tip 162 has leading and trailing edges 170 and 172 that are connected by side edges oriented at one or more predetermined angles $\theta_1$ with respect to the Y axis. The width 176 of the leading edge 170 and the angular orientation of the side edges 174 can provide a number of different shapes, such as trapezoids, rectangles, polygons, and rhomboids, that can be selectively used at will. Regardless of the shape of the leading and side edges 170 and 174, increased skew angle can reduce the time in which the trailing edge 172 is between data bits, as shown in FIG. 3.

To increase the time the trailing edge 172 can switch magnetization between data bits, the trailing edge 172 can be tuned to a predetermined shape defined by a recess that extends from the trailing edge 172 towards the leading edge 170. The recess can be shaped in a variety of different fabrication and design characteristics that provide multiple trailing edge protrusions 178 respectively adapted to mitigate extreme positive and negative skew angle tilt. While the protrusions 178 can be independently shaped with differing parameters, the recess shown in FIG. 4 is shaped substantially as a "V" where the protrusions 178 are each defined by a surface sloped at a predetermined angle θ with respect to the X axis.

Figure 5:
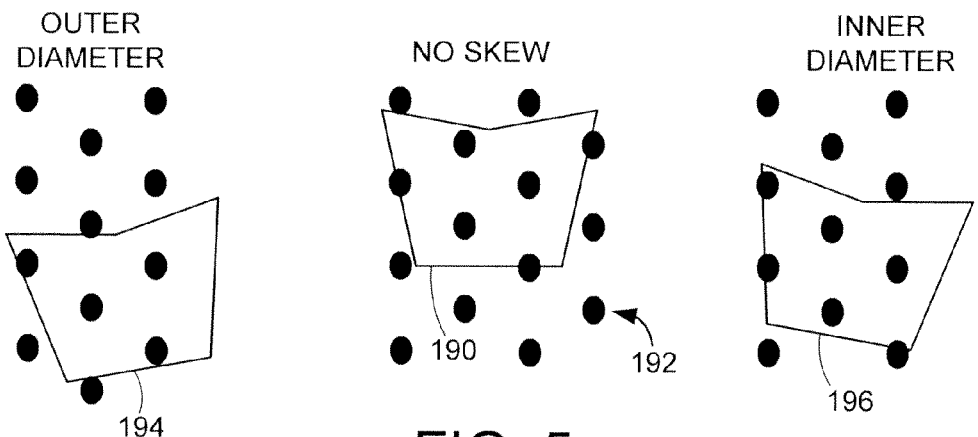
FIG. 5 illustrates an isometric view of a portion of an example magnetic element constructed in accordance with various embodiments.

The predetermined angle of the sloped trailing edge surfaces produces extended protrusions 178 that can be tuned to be significantly perpendicular to data tracks when positioned at extreme positive and negative skew angles, which can maximize the non-magnetic space between data bits to allow for more time for the pole tip 174 to switch magnetization. FIG. 5 provides a general illustration of how the trailing edge of an example write pole tip can be tuned to mitigate large skew angle data bit programming. As shown by pole tip 190, a v-shaped trailing edge can be configured so that data bits 192 of multiple data tracks can be efficiently programmed at a zero skew angle despite have a slightly reduced overall pole tip length, as measured from the leading edge to the trailing edge.

The optimization of the trailing edge protrusions becomes evident one the pole tip 190 is at large skew angles, such as pole tip 194 tilted at the extreme positive skew angle and pole tip 196 positioned at the extreme negative skew angle. The shaped recess of the trailing edge of each pole tip 194 and 196 provide protrusions angled in opposite directions to orient an outer portion of the trailing edge perpendicular with the data track for both positive and negative skew angles. In operation, the orientation of the sloped surfaces of the trailing edge allows the pole tips 194 and 196 to engage the data bits 192 with maximum time to switch magnetizations between data bits than if the trailing edge was not shaped, as shown in FIG. 3.

Figure 6A:
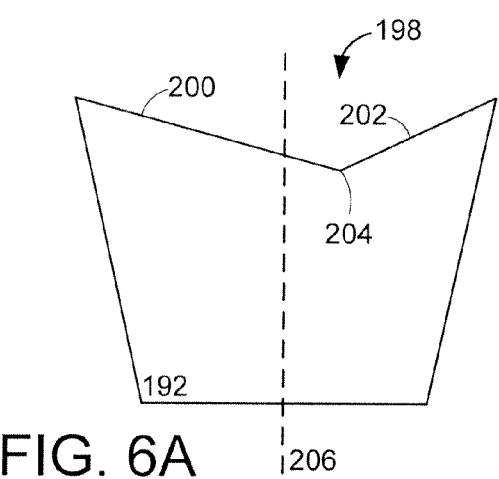
FIGS. 6A-6C show a top view of an example two dimensional data read sensor constructed capable of being used in the data storage device of FIG. 1.
Figure 6B:
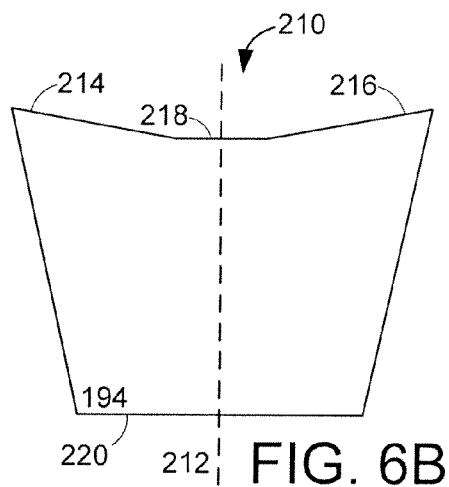
Figure 6C:
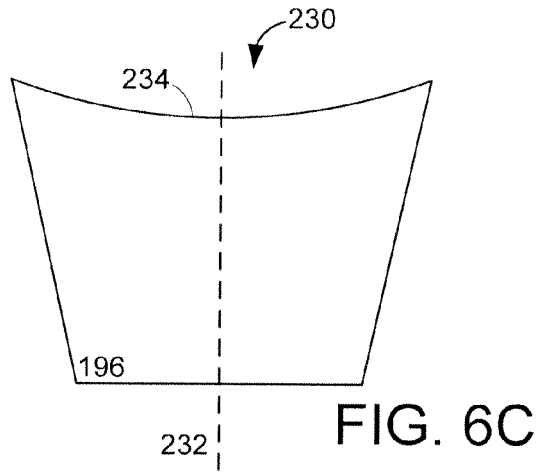

With the ability to shape the trailing edge of the pole tip, protrusions can be shaped to respectively mitigate skew angle effects at positive and negative skew angles. However, the v-shaped trailing edge recess shown in FIGS. 4 and 5 is not required or limited as various tuned trailing edge recess shapes can produce a variety of symmetrical and asymmetrical protrusions. FIGS. 6A-6C respectively show example write pole tips 192, 194, and 196 that have uniquely tuned trailing edges illustrative of the diverse tuning possibilities provided by a shaped trailing edge recess.

In FIG. 6A, recess 198 is shaped as an asymmetrical "V" defined by trailing surfaces 200 and 202 sloped at differing angles to a pinnacle 204 offset from a plane 206 positioned about the midpoint of the pole tip 192. The asymmetrical recess 198 can provide protrusions tuned to mitigate specific skew angles, data track widths, and data bit densities that may vary for different regions of a data storage media.

FIG. 6B displays a recess 210 configured in a "V" shape symmetrical about a central plane 212. As opposed to the dual trailing surfaces provided in the pole tips of FIGS. 4 and 5, recess 210 is shaped to two sloped surfaces 214 and 216 joined by a median surface 218 that is substantially parallel to the leading surface 220 of the pole tip 194. The inclusion of the median surface 218 may increase data programming with little to no skew angle as a portion of the trailing surface matches the shape of the non-magnetic space between data bits when the pole tip is skewed.

FIG. 6C shows another "V" shaped recess 230 symmetrical about a central plane 232. The recess 230 is formed by a continuously curvilinear surface 234 that can allow for simplified manufacturing while reducing the risk of magnetic shunting between the pole tip and adjacent magnetic shields, such as shield 168 of FIG. 4. It should be noted that the shapes of the various recesses 198, 210, and 230 can be combined and modified, at will, to provide sloped surfaces adapted to mitigate skew angle misalignment between the trailing edge and data bits of adjacent data tracks.

Figure 7:
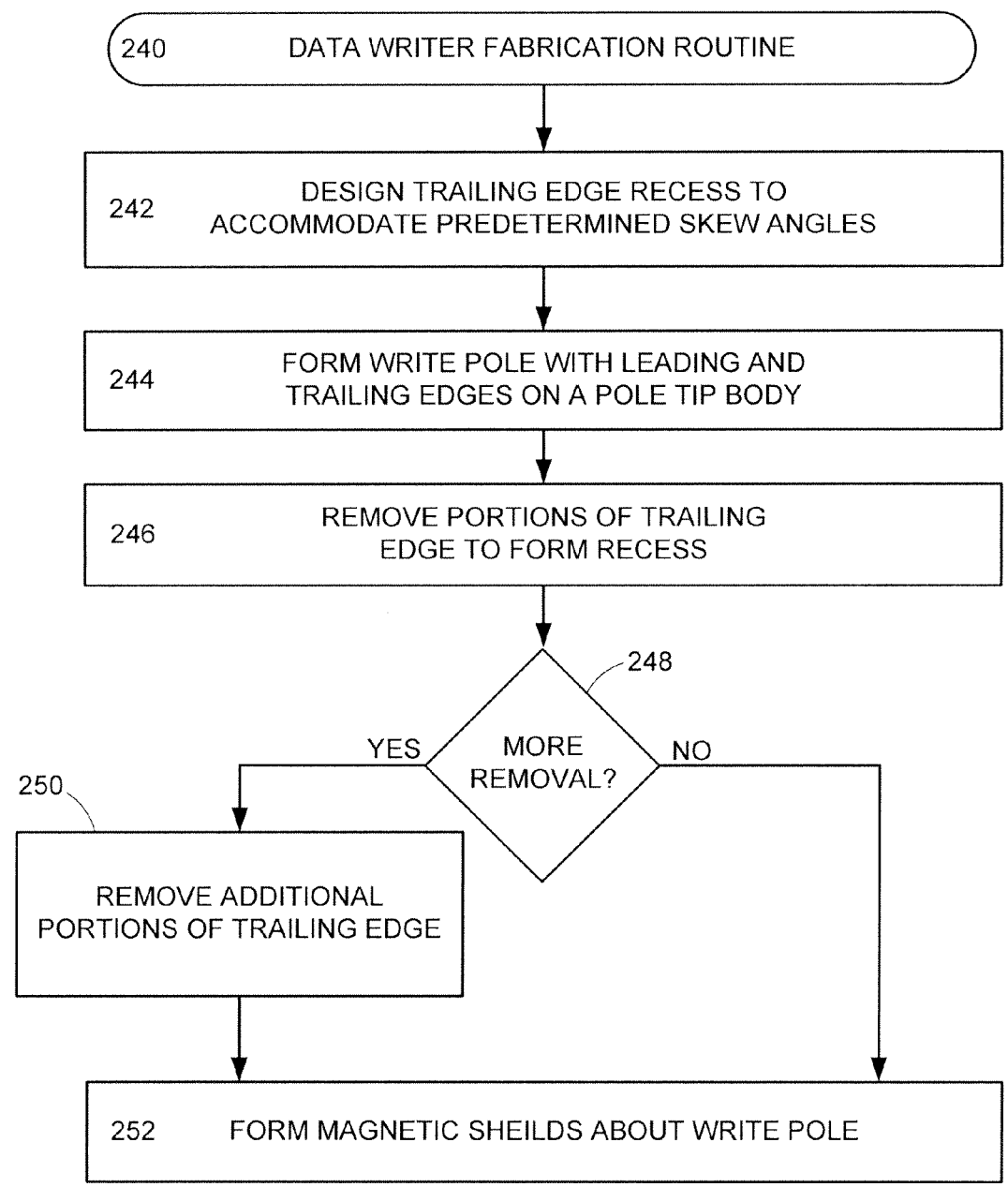
FIG. 7 provides a flowchart of a data writer fabrication routine conducted in accordance with various embodiments.

FIG. 7 provides an example data writer fabrication routine 240 performed in accordance with various embodiments. The routine 240 may begin by designing a trailing edge recess in step 242. Among the unlimited variety of characteristics that can contribute to the design of the trailing edge recess for a magnetic write pole, the expected skew angle range, data bit density, and data track width can all be assessed to provide a trailing edge with multiple protrusions capable of mitigating skew angle effects for positive and negative skew angle write pole orientations. In some embodiments, the trailing edge recess is designed to have protrusions angled at roughly half the largest encountered skew angle to allow for skew angle effect mitigation across a wide skew angle spectrum.

With a trailing edge recess tuned to provide predetermined operational behavior, such as mitigating skew angle misalignment, step 244 forms a write pole with a pole body having leading and trailing edges. As shown in FIG. 4, the pole body may have a general shape, like a trapezoid, where the leading edge has a narrow width that connects to the trailing edge via angled side surfaces. Various embodiments form a write pole body with an average width that is roughly twice the width of a data track. Regardless of the shape and size of the write pole body, step 246 begins constructing the trailing edge recess by removing predetermined portions of the trailing edge, such as with etching.

While portions of the trailing edge have been removed in step 246, decision 248 evaluates if the trailing edge recess design of step 242 is present in the write pole tip and whether additional removal is necessary. For example, an asymmetric trailing edge recess may correspond with more than one removal step in contrast to a continuously curvilinear recess that could be formed with only one removal step. If indeed more material is to be removed to form the designed trailing edge recess, step 250 proceeds to remove the additional portions.

At the conclusion of step 250 or if no additional removal operations are to be conducted from decision 248, step 252 then forms magnetic shields about the write pole tip to construct a functional data writer, which can be implemented in a data transducing head that is suspended from a slider, such as slider 112 of FIG. 1. Through the various steps and decisions of routine 240, a data writer can be constructed with a trailing edge tuned to mitigate skew angle effects. However, the routine 240 is not limiting as the steps and decisions shown in FIG. 7 can be omitted, changed, and added. For example, a bit patterned media can be evaluated for data bit size, density, and data track width prior to step 242 to allow a trailing edge recess that precisely accommodates a data media.

The various structural configurations of the trailing edge recess can allow a write pole tip to efficiently program data over a wide variety of skew angles without having to adjust data bit timing or media rotation speed. Additionally, the ability to tune the trailing edge recess provides the ability to shape the trailing edge to accommodate different skew angle, data bit density, and data track width environments. While the embodiments have been directed to magnetic recording, it will be appreciated that the claimed technology can readily be utilized in any number of other applications, such as 1707 data sensing.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
    a data storage medium with a plurality of data bits patterned in a plurality of concentric adjacent data tracks each having a common width and different diameters from a center of the data storage medium on a write pole facing surface; and
    a write pole tip positioned adjacent the data storage medium, the write pole tip configured with leading and trailing edges on opposite sides of a tip body, the trailing edge shaped by first and second recess surfaces extending into the tip body towards the leading edge at an angle perpendicular to the common width when the write pole tip is positioned at a maximum skew angle relative to the plurality of data tracks.

2. The apparatus of claim 1, wherein the trailing edge is configured as a v-shape.

3. The apparatus of claim 1, wherein the recess surfaces shape at least two protrusions on the trailing edge.

4. The apparatus of claim 1, wherein the recess surfaces are continuously extending across multiple data tracks.

5. The apparatus of claim 4, wherein the recess surfaces connect via a median surface configured parallel to the leading edge.

6. The apparatus of claim 1, wherein each recess surface is angled with respect to the leading edge.

7. The apparatus of claim 1, wherein each recess surface has a common angle that meet at a midpoint of the tip body.

8. The apparatus of claim 1, wherein the recess surfaces are symmetrical about a central plane of the tip body.

9. The apparatus of claim 1, wherein the recess surfaces are asymmetrical about a central plane of the tip body.

10. The apparatus of claim 1, wherein the leading and trailing edges are respectively connected by side surfaces.

11. The apparatus of claim 1, wherein the recess surfaces define a single continuously curvilinear surface along the trailing edge.

12. The apparatus of claim 1, wherein the data bits of the storage medium are configured as a bit patterned media.

13. The apparatus of claim 1, wherein the tip body is sized to concurrently cover a plurality of the adjacent data tracks.

14. The apparatus of claim 1, wherein the write pole tip is configured to conduct shingled data recording to the adjacent data tracks.

15. An apparatus comprising:
    a data storage medium with a plurality of data bits patterned in a plurality of concentric adjacent data tracks each having a common width and different diameters from a center of the data storage medium on a write pole facing surface; and
    a write pole tip positioned adjacent the data storage medium, the write pole tip configured with leading and trailing edges on opposite sides of a tip body, the trailing edge shaped into two protrusions by first and second recess surfaces extending into the tip body towards the leading edge at a common angle with respect to the leading edge towards a central plane of the tip body, the common angle positioning at least one recess surface perpendicular to the common width when the write pole tip is positioned at a maximum skew angle relative to the plurality of data tracks.

16. The apparatus of claim 15, wherein the first and second recess surfaces each extend beyond a width of the leading edge.

17. The apparatus of claim 15, wherein the first and second recess surfaces are continuously linear.

18. The apparatus of claim 15, wherein the common angle of the first and second recess surfaces is half the maximum skew angle with respect to the leading edge.

19. An apparatus comprising:
- a data storage medium with a plurality of data bits patterned in a plurality of concentric adjacent data tracks each having a common width and different diameters from a center of the data storage medium on a write pole facing surface; and
- a write pole tip positioned on an air bearing surface (ABS) adjacent the write pole facing surface, the write pole tip disposed between first and second side shields and leading and trailing shields on the ABS, the write pole tip configured with leading and trailing edges connected by tapered side edges to define a tip body, the trailing edge shaped by first and second recess surfaces extending into the tip body towards the leading edge at an angle perpendicular to the common width when the write pole tip is positioned at a maximum skew angle relative to the plurality of data tracks.

20. The apparatus of claim 19, wherein the first and second side shields are angled to match a taper angle of the tapered side edges of the tip body.

\* \* \* \* \*